Sept. 15, 1953     A. W. WANZER ET AL     2,652,013

MATTRESS TUFTING MACHINE

Filed Dec. 27, 1950                        9 Sheets-Sheet 1

Fig. 1.

Inventors:
Arthur W. Wanzer
David G. Way
Frederick E. Ralning by Louis C. Smith   Attorney

Sept. 15, 1953  A. W. WANZER ET AL  2,652,013
MATTRESS TUFTING MACHINE
Filed Dec. 27, 1950  9 Sheets-Sheet 2

Inventors:
Arthur W. Wanzer
David G. Way
Frederick E. Kalning
by Louis C. Smith
Attorney Sept. 15, 1953     A. W. WANZER ET AL     2,652,013

MATTRESS TUFTING MACHINE

Filed Dec. 27, 1950                                                      9 Sheets-Sheet 9

Patented Sept. 15, 1953

2,652,013

UNITED STATES PATENT OFFICE 2,652,013

MATTRESS TUFTING MACHINE

Arthur W. Wanzer, Hingham, and David G. Way and Frederick E. Kalning, Quincy, Mass., assignors to United Mattress Machinery Co. Inc., Quincy, Mass., a corporation of Maine Application December 27, 1950, Serial No. 202,921

18 Claims. (Cl. 112—3)

This invention relates to a mattress tufting machine of the type which performs the tufting operation by inserting one end of the tufting cord, tape or braid upwardly through the mattress at one point and then downwardly through the mattress at a different point, thereby to form a loop of braid in the mattress, and then knotting together the two ends of the loop beneah the mattress.

In the machine herein shown the loop of tape or braid is inserted in the mattress by two spaced needles moving in unison, and one of which inserts one end of the braid upwardly through the mattress and the other of which pulls said braid end downwardly through the mattress, and one object of the invention is to provide novel means for transferring the braid end from the first needle to the second after the needles have been thrust upwardly through the mattress.

Other objects of the invention are to provide novel means for knotting the ends of the loop of braid together; to provide novel means for reeving the tufting loop through the mattress to draw the knot through the ticking, and to otherwise improve mattress tufting machines of this type in the particulars hereinafter set forth.

In the drawings;

Fig. 6 is a section on the line 6—6, Fig. 5;

Fig. 7-A is a fragmentary sectional view showing the means for shedding the tufting loop from the loop reeving means;

Fig. 8 is a section on the line 8—8, Fig. 7;

Fig. 9 is a section on the line 9—9, Fig. 4;

Fig. 12 is a section on the line 12—12, Fig. 10;

Fig. 13-A shows the knife for cutting the tufting braid;

Fig. 15a is a fragmentary view showing the braid clamping member in action;

The operative parts of the machine are mounted on the frame 1 which presents the base portion 1 carrying a lower head 3 and an overhanging arm 4 carrying an upper head 5. The mattress to be tufted is placed between the two heads 3 and 5 and may be supported on any usual mattress support (not shown) such as is commonly used in connection with mattress tufting machines. The upper head 5 has associated therewith a compression foot 6 which is vertically movable for the purpose of compressing the mattress at the point where it is to be tufted.

Situated beneath the lower head is a needle bar 7 carrying two needles, a rear threaded needle 8 and a front non-threaded needle 9. The rear needle 8 has an eye 10 and an axial bore 11 through which the tufting tape or braid 12 is lead to the eye, said braid extending through the eye, and when the machine is at rest having a free end 13 extending from the eye.

The front needle 9 also has an eye 14 and an axial bore 15 in which is received a braid-clamping pin or rod 16 for the purpose of clamping the free end 13 of the braid in said eye 14 as will presently be described.

Figure 2:
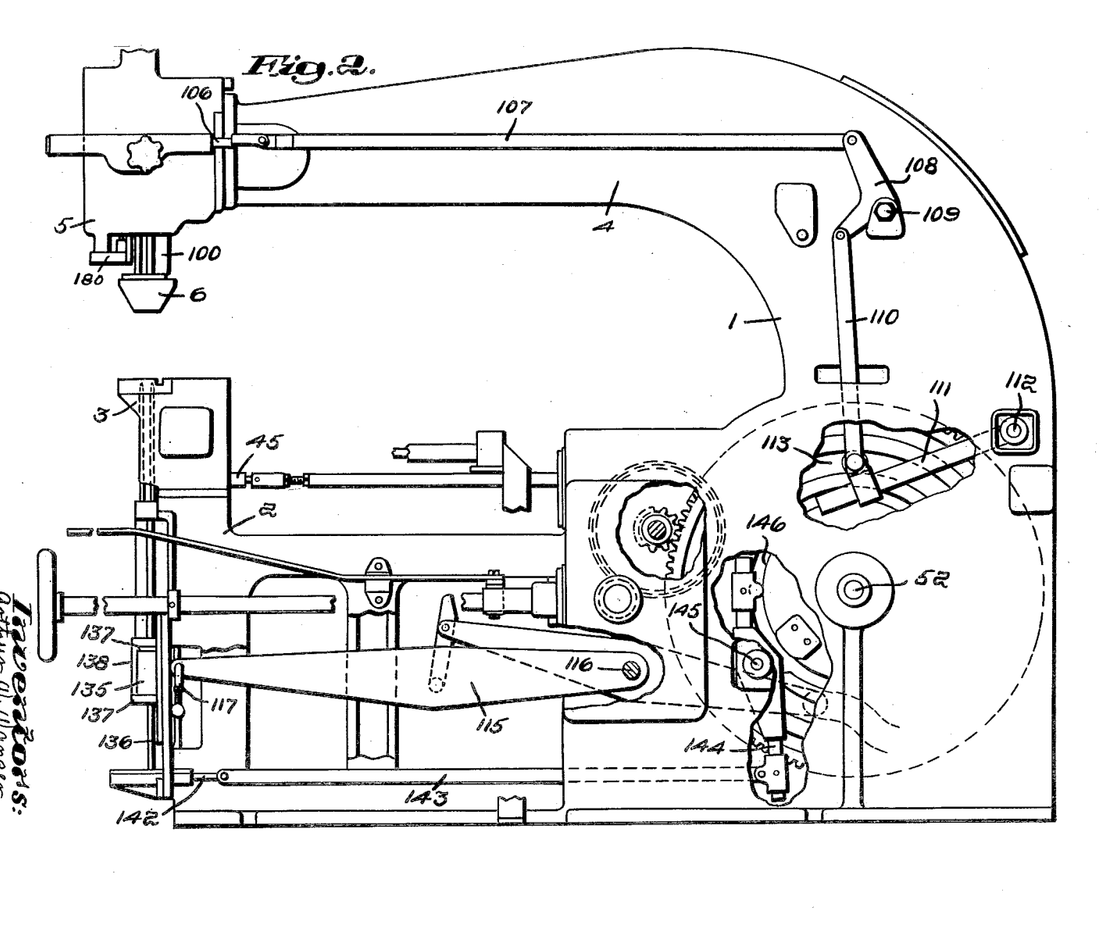
Fig. 2 is a view of the machine looking from the other side.
Figure 3:
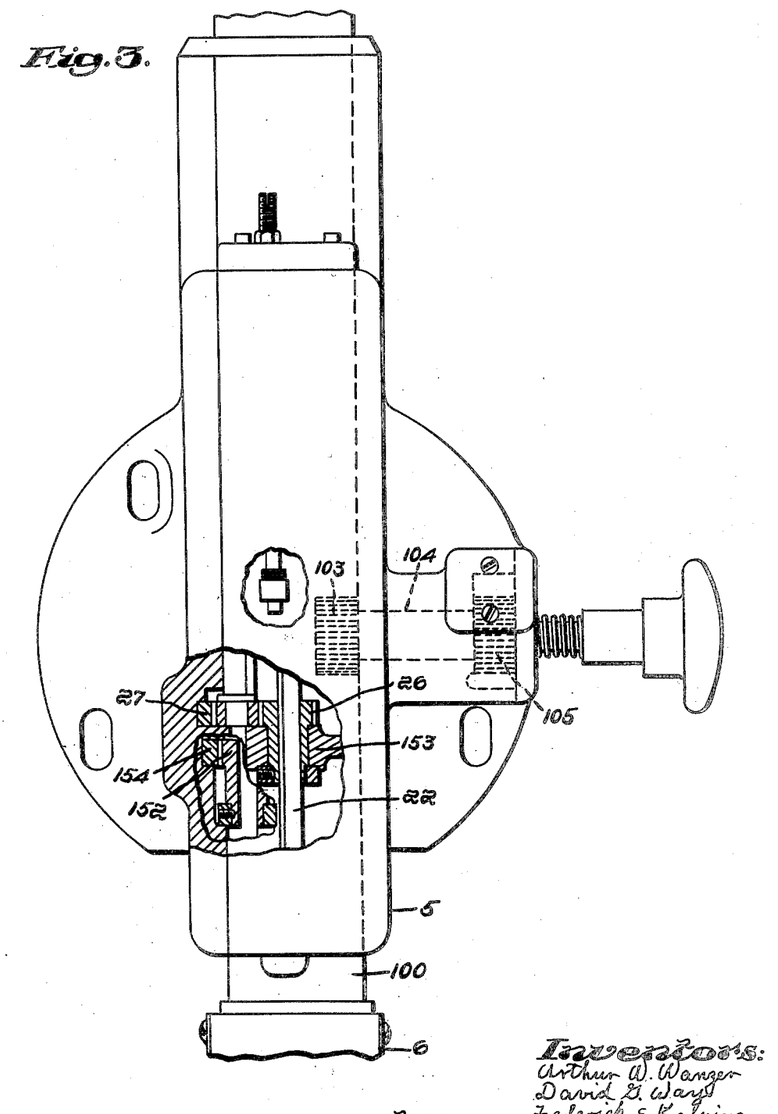
Fig. 3 is a front view of the upper head.

The mattress 17 to be tufted is placed between the lower head 3 and the compressor foot 6, and after this is done the compressor foot is moved downwardly relative to the upper head 5, thereby compressing the mattress at the point where the tufting braid is to be inserted. For giving the compressor foot its vertical movement it is provided with a stem 100 which extends upwardly into the upper head 5 and is provided with rack teeth 101 that mesh with a pinion 102 mounted in said upper head. Said pinion 102 meshes with a second pinion 103 fast on a shaft 104 which has thereon another pinion 105 that is engaged by a rack bar 106 which is connected by a link 107 (see Fig. 2) to an elbow lever 108 pivoted to the frame 1 at 109. Said elbow lever is connected by a link 110 to a cam actuated arm 111 pivoted at 112 and operated by a cam 113 mounted on a cam shaft 52. Said cam and the above connections operate to move the compressor foot 6 downwardly at the beginning of a cycle of tufting operations thereby to compress the mattress and then to raise the compressor foot when the cycle of operations has been completed.

After the compressor foot has been given its downward mattress compressing movement, the needle bar 7 is moved upwardly to carry the pointed ends of the needles through the mattress and through the compressor foot and into the portion 180 of the upper head 5, the rear needle 8 carrying with it the braid or tape 12 having the free end 13 extending from the needle eye 8. The needle bar 7 is given its vertical movement by means of a lever 115 pivoted at 116 and having its front end connected to the needle bar by a link 117, the rear end of said lever being acted on by a suitable cam mounted on the cam shaft 52. While the needles are at rest at their top position, the free end 13 of the braid is transferred to the eye 14 of the front needle and clamped therein by the clamping pin 16.

The transfer of said free end 13 is accomplished by a transfer hook member 18 which is carried by a hook carrier 19 that is mounted for reciprocating movement in the portion 180 of the upper head 5. Said hook carrier is connected by a link 20 to an arm 21 fast on a vertical shaft 22 mounted in the upper head, the construction being such that turning movement of the shaft will move the hook member 18 in the direction of its length. During the upward movement of the needles the hook member is in the position seen in Figs. 5 and 22, and as the threaded rear needle reaches its top position, the depending free end 13 of braid is placed within the hook 23 of said hook member. The shaft 22 is then turned thereby to give the hook carrier 19 and the hook member 18 a movement to the right in Fig. 5, during the initial part of which movement the hook 23 picks up the free end 13 of the braid. As the hook member continues its movement the needle bar 7 is lowered slightly so that during the final movement of the hook member the free end 13 of the braid is laid across the eye 14 of the needle 9 as seen in Fig. 23.

Figure 5:
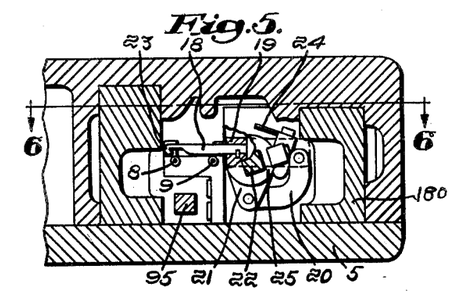
Fig. 5 is a section on the line 5—5, Fig. 4.
Figures 20, 21, 22, 23:
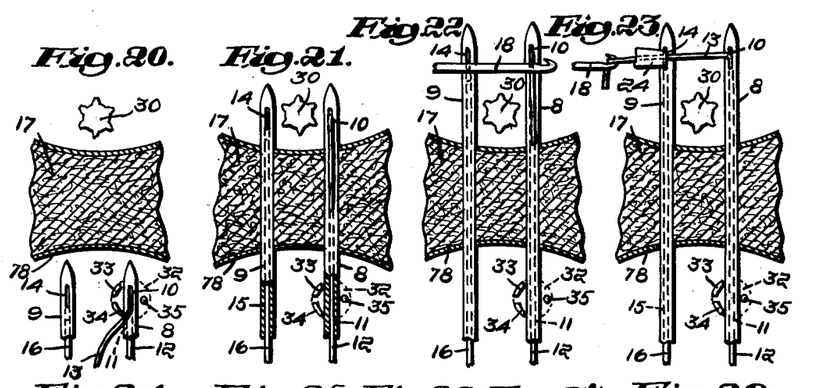
Figs. 20 to 33 are diagrammatic views illustrating the manner in which the tufting of a mattress is accomplished with the machine illustrated.

While the free end 13 is in this position, it is tucked into the needle eye 14 by a finger 24 (see Figs. 5, 23 and 23a) which is carried by a hub or collar 25 on the shaft 22, the arrangement being such that the turning movement of the shaft 22 by which the hook member is operated also swings the finger 24 from its inoperative position shown in Fig. 5 into its operative position shown in Figs. 23 and 23a, in which the end of the finger engages the free end portion 13 of the braid 12 and pushes it into the needle eye 14. After the hook and tucking finger have performed their function they are returned to their initial positions by a reverse turning movement of the shaft 22.

For giving said shaft 22 its operative movements it has mounted thereon a pinion 26 which meshes with a rack 27 slidably mounted in the upper head 5, which rack is given a reciprocating movement by suitable connections actuated by a cam mounted on the cam shaft 52. After the end 13 of the braid has been tucked into the eye 14, it is clamped therein by the clamping pin 16 which extends axially of the needle 9. The lower end of the clamping pin 16 has a head 116 (Fig. 15) received in a recess 117 formed in a block 118 which is mounted on the needle bar for slight vertical movement relative thereto, and in the recess 117 is a spring 119 which acts against the head 116 and tends to hold the clamping pin in its raised clamping position. Mounted on the block 118 is a small plate 120, the edge of which overlies the head 116. During the movement of the hook member 18 above described, the block 118 is moved downwardly slightly, such downward movement operating through the plate 120 to move the head 116 and the clamping pin 16 downwardly so that its upper end is below the eye 14 of said needle. Said eye is thereby opened to receive the end 13 of the braid when it is tucked thereinto by the tucking finger 24. The block 118 then rises slightly and the clamping pin is moved into its braid-clamping position by the spring 119. The needle bar 7 is then retracted and the needles are withdrawn from the mattress, and during this operation the end of the braid which is gripped by the needle 9 is drawn downwardly through the mattress and at the same time braid from the source of supply pays out through the rear needle 8, so that when the needles reach their low position a loop 28 of braid will have been formed in the mattress, with a portion 29 of the loop exposed on the top of the mattress, as seen in Fig. 24.

It may be remarked at this time that the compressor foot 6 carries a rotatable toothed member 30 which is situated between paths of travel of the two needles and, being mounted on the compressor foot, is below the end 13 of the braid when it has been transferred to the front needle. Consequently, when the loop 28 is formed as above described, the exposed portion 29 of the loop will overlie said toothed member 30. The function performed by said toothed member will hereinafter be referred to.

After the loop 28 has thus been formed, the end 13 of the braid is knotted to the portion 31 of the braid between the mattress and the lowered needle 8. The knotting mechanism is carried by the lower head 3 and it comprises a rotary looper 32 having at its inner end three loop-forming projections, 33, 34, and 35, the projection 35 being longer than the other two. Said looper 32 is capable, not only of rotative movement, but also of movement in the direction of its axis. During the time the needles 8 and 9 are moving upwardly and then downwardly to form the loop 28 in the mattress, the looper 32 is in the position shown in Figs. 10 and 21, in which the two shorter projections 33, 34 are on one side of the path of the rear needle 8 and the longer projection 35 is on the other side of said path. Hence, during the upward and downward movement of said needle 8 it passes between the long projection 35 and the two shorter projections 33, 34 as seen in Figs. 20 to 24. When the needles have reached their low position the section 31 of braid between the mattress and the rear needle 8 lies between the long projection 35 and the two shorter projections 33, 34 as seen in Fig. 24.

Figure 1:
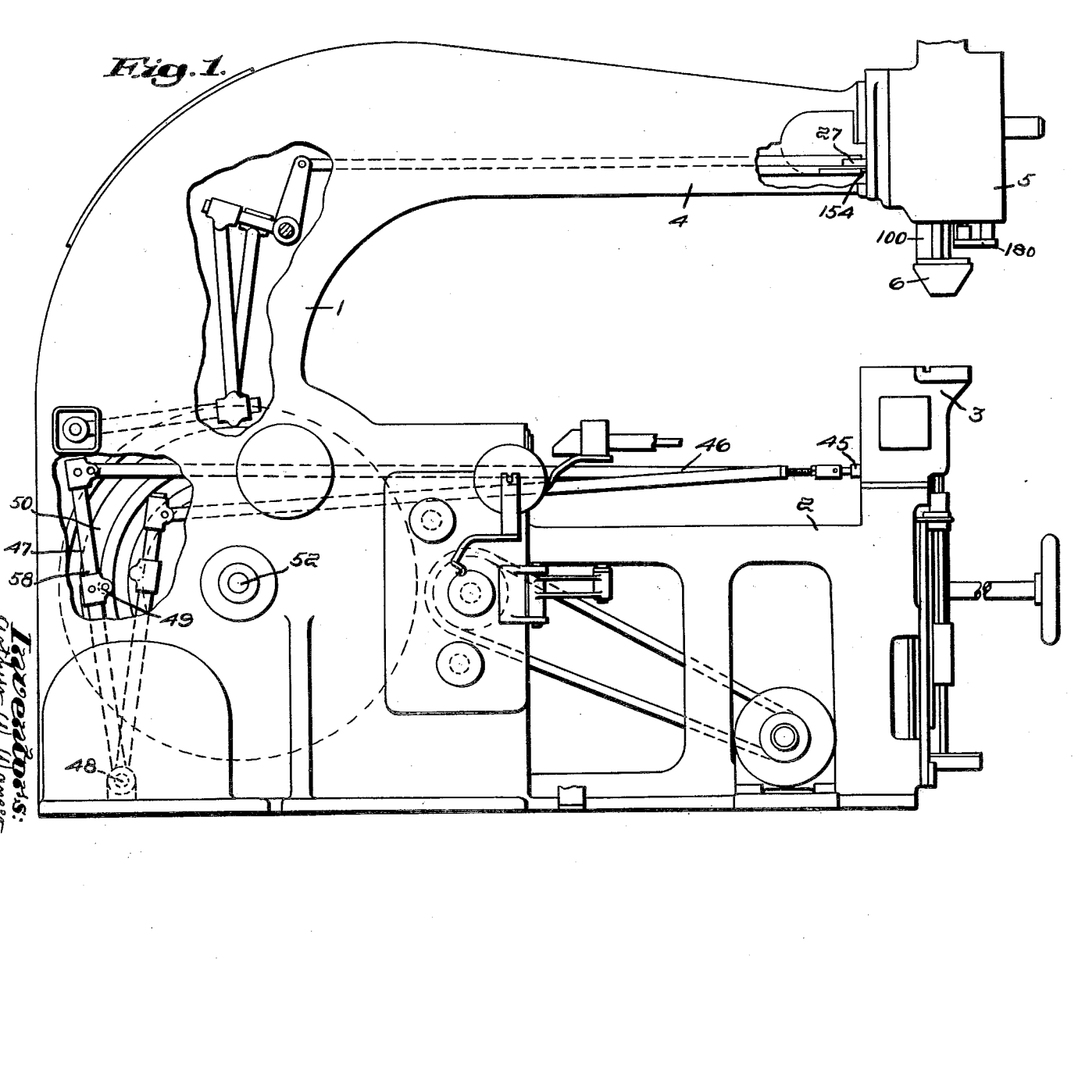
Fig. 1 is a side view of a tufting machine embodying the invention with portions broken out.
Figures 24, 25, 26, 27, 28, 29, 30, 31, 32, 33:
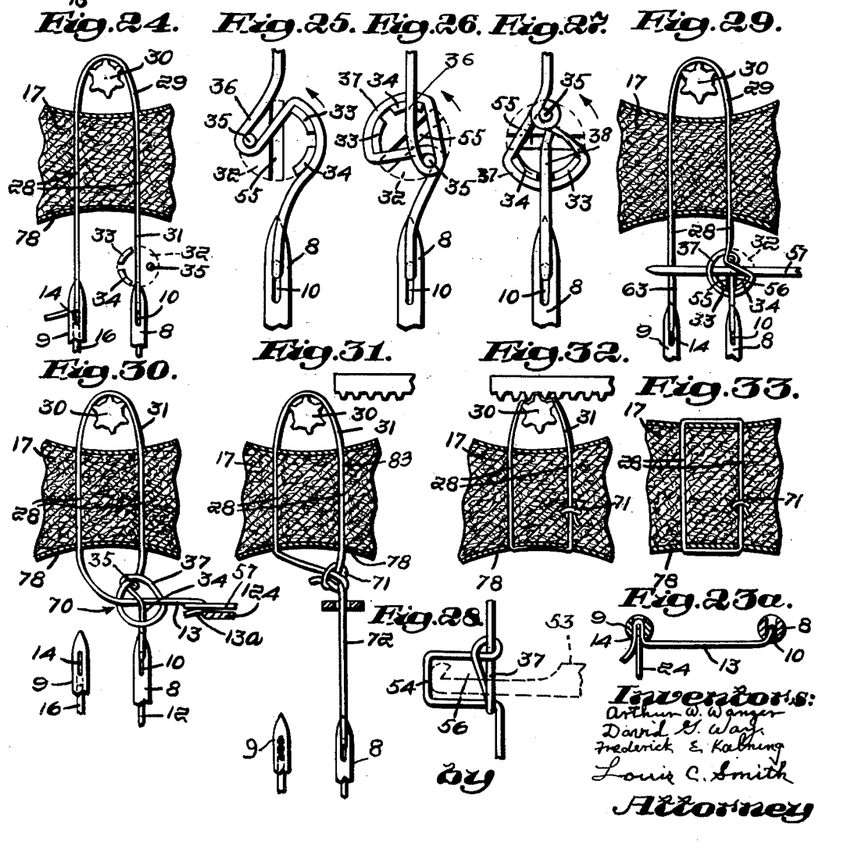

The looper 32 is then given approximately 1¼ turns above its axis, said looper coming to rest in approximately the position shown in Fig. 27. The long projection 35 is relatively small and round and has the shape shown in Fig. 10 so that when during the turning movement of the looper 32 it reaches the position shown in Fig. 25, the portion 36 of the braid which is caught by said smaller and longer projection 35 slides forwardly toward the tip of said projection, with the result that during further turning movement from the position shown in Fig. 25 to that shown in Figs. 26 and 27 the shorter projections 33, 34 pass in behind the section 36 of the braid. When the looper comes to rest in the position shown in Fig. 27, the braid passes around the projection 35, thence around the projections 33 and 34 and then over the projection 35, thereby forming the loop 37, the portion 38 of the braid leading from the projection 35 to the needle 8 extending diametrically across said loop 37. The looper 32 is given its turning movement by means of a rack 39 mounted in the lower head 3 and having teeth that mesh with long teeth 40 with which the looper is provided. The rack 39 has other teeth 41 which mesh with the teeth of a pinion 42 on a vertical shaft 43 mounted in the lower head 3 (see Figs. 10 and 11). Said shaft 43 has at its lower end another pinion 44 that meshes with a rack 45, and said rack 45 is connected by a link 46 to an arm 47 pivoted at 48 and having a follower 49 operating in a cam groove 50 formed in a cam 51 mounted on the cam shaft 52 (see Fig. 1).

When the loop 37 is formed as above described and as shown in Fig. 27, the portion 38 of the braid is pushed through the loop 37 by means of a plunger 53, thereby forming a secondary or supplemental loop 54. The plunger is carried by a slide 121 which has pivotally connected thereto one end of a curved link 122, the other end of said link being pivotally connected to an arm 123 fast on a vertical shaft 69 that is mounted in the lower head 5. Turning movement of the shaft 69 in a counter-clockwise direction Fig. 10 will thus move the slide 121 and plunger 53 toward the right, and during such movement the end of the plunger engages the portion 38 of the braid and pushes it through the loop 37 which is held on the looper, thereby forming the supplemental loop 54. It will be understood that the looper 32 is formed with an axial recess to receive the end of the plunger and the loop 54 when it is being formed.

Figure 10:
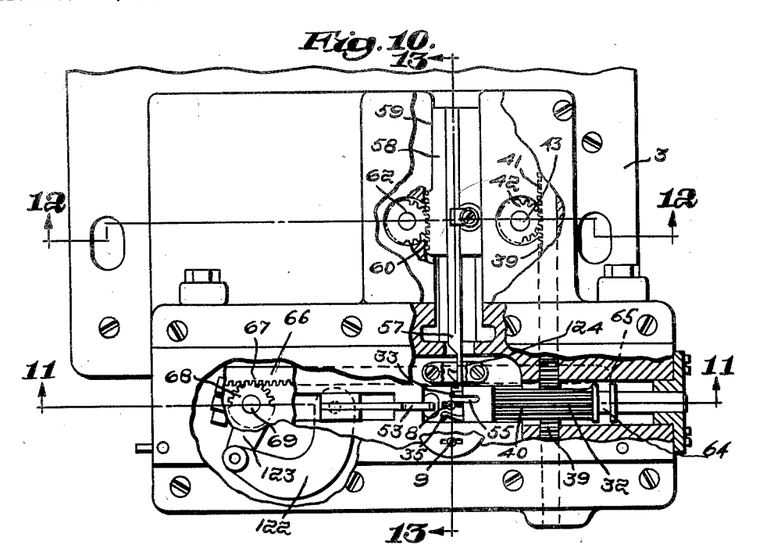
Fig. 10 is a plan view of the lower head with parts broken out.

During the formation of said supplemental loop 54 the looper 32 is given a movement to the left Fig. 10 while the plunger is moving to the right, such movement of the looper serving to more securely retain the loop 37 on the looper. For this purpose there is provided a sliding bar 66 having one end 65 bent laterally and extending into a circumferential groove 64 formed in the looper, said bar having rack teeth 67 which engage the teeth of a pinion 68 fast on the shaft 69. Hence, the counter-clockwise turning movement of said shaft operates through the bar 66 to move the looper 32 to the left while the plunger 53 is moving to the right in Fig. 10.

After the supplemental loop 54 has been formed as described above, the end 13 of the braid is released from the needle 9 and is drawn through said loop as shown in Fig. 30. For this purpose there is employed a hook member 57 which is mounted in the lower head 3 for movement in a direction at right angles to that of the plunger 53 as seen in Fig. 10.

The looper 32 has a slot 55 extending transversely across its inner end, and the plunger is cut away or recessed near its inner end as shown at 56. These parts are so formed that when the plunger and the looper have been moved into the relative positions they occupy when the plunger has been advanced to push the supplemental loop 54 through the loop 37, the recess 56 of the plunger registers with the slot 55 of the looper and the slot is positioned in line with the hook member 57. With the parts in this position the hook member 57 is moved forward from the position shown in Fig. 10 and passes through the slot 55 and through the recess 56 and thus through the supplemental loop 54 which is held open by the end of the plunger. The forward movement of the hook member is sufficient so that the hook thereof engages the portion of the braid that is held by the front needle 9. At this time the braid end is released from the needle 9 by moving the clamping pin 16 downwardly and the hook member is withdrawn thereby drawing the released end through the supplemental loop as shown in Fig. 30. When the hook member comes to rest in the position shown in Fig. 10, the extreme end 13a of the end portion 13 of the braid is held clamped between the hook member 57 and a plate 124. After the braid end 13 has thus been drawn through the supplemental loop 54 the plunger 53 is withdrawn and the looper 32 is moved backwardly or to the right in Fig. 11 thereby shedding the loop 37 from the shorter projections 33 and 37 of the looper but not from the longer projection 35 and forming a loose knot 70, which is subsequently tightened on said longer projection and then shed therefrom.

The hook member 57 is carried by a sliding block 58 (see Fig. 10) mounted to reciprocate in ways 59 in the lower head 3. Said block has rack teeth 60 which mesh with a pinion 61 on a vertically extending shaft 62 mounted in the lower head. Turning movement of the shaft 62 clockwise will advance the hook member 57 and a reverse movement of the shaft will retract said member.

During all of the above operations except that of inserting the needles through the mattress the braid is free to pay out through the needle 8 as necessary, but as soon as the loose knot 70 is formed the braid is clamped below the needle 8 by a clamping member carried by the block 118, and the latter is moved downwardly pulling downwardly on the portion 72 of the braid (see Fig. 31) and tightening the knot on the long looper projection 35, from which it is immediately shed as shown at 71.

The block 118 is provided with a duct 125 through which the braid passes to the needle 8, and pivotally mounted in the block at 127 is a circular clamping member 126 having a clamping portion 128. Mounted in the block 118 is spring 129 acting against a plunger 130 which engages an arm 131 extending from the clamping member. The spring tends to move the arm 131 upwardly, such upward movement turning the clamping member and moving the clamping portion 128 across the duct 125, thereby to bend the braid around the corner 132 and clamp it against the wall 133.

Figures 15, 16, 17, 18, 19:
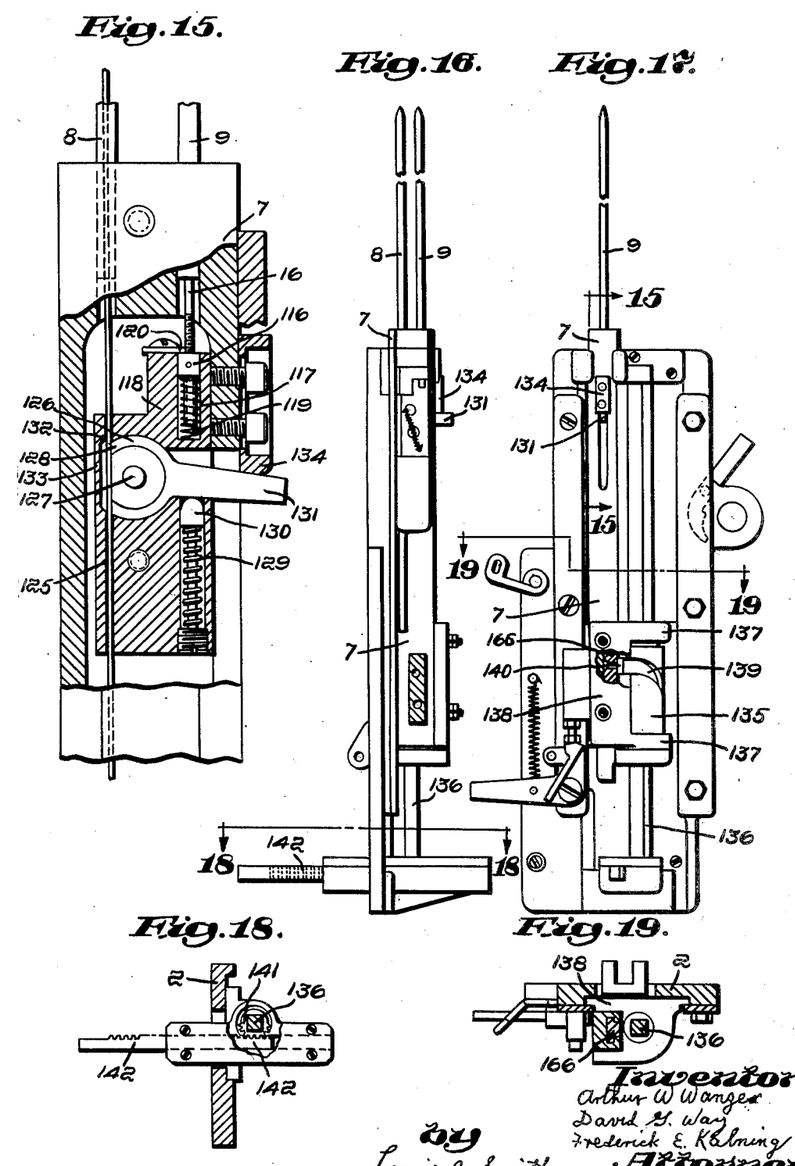
Fig. 15 is a fragmentary sectional view showing the means for applying and releasing tension on the tufting braid during the tufting operation, said figure being broken out on the line 15—15, Fig. 17.
Fig. 16 is a side view of needle bar with the needles therein.
Fig. 17 is a front view of the construction shown in Fig. 16.
Fig. 18 is a section on line 18—18, Fig. 16.
Fig. 19 is a section on line 19—19, Fig. 17.

However, during the insertion of the braid in the mattress to form the tufting loop 28 and also during the formation of the loose knot 70, the clamping member 126 is held in its inoperative position shown in full lines Fig. 15, by the engagement of the arm 131 with a stop member 134 carried by the needle bar 7 so that the braid is free to pay out through the duct 125 and the needle 8 as necessary.

When the loose knot 70 has been formed, the block 118 is moved downwardly relative to the needle bar 7, thereby separating the arm 131 from the stop member 134, and when this occurs, the spring 129 forces said arm 131 upwardly. The upward movement of the arm turns the clamping member into its operative position shown in Fig. 15a thereby clamping the braid to the block 118.

With the braid thus clamped to said block the latter is moved further downwardly relative to the needle bar thereby applying a pulling force on the braid below the loose knot 70 and tightening the same as shown at 71, Fig. 31. The downward movement of the block 118 necessary to tighten the knot is produced by a cylinder cam 135 (see Fig. 17) which is mounted on a vertical square shaft 136 journalled in the base portion of the frame 1. Said cam is retained between arms 137 of a cam holder 138 that is secured to the lower end of the vertically extending needle bar 7 and hence moves up and down on the square shaft with the needle bar.

The cam has a cam groove 139 in which is received a roll 140 secured to an extension 166 of the block 118, so that when the cam is turned about its axis from the position shown in Fig. 17, the block 118 will be moved downwardly, thereby applying the required downward pull on the braid to tighten the knot 71.

The square shaft 136 has a pinion 141 thereon at its lower end which meshes with a rack 142 that is connected by a link 143 to a cam actuated lever 144 pivoted at 145 and operated by a cam 146 mounted on the cam shaft 52. Said cam gives the rack 142 the necessary reciprocating movement to oscillate the cylinder cam 135 and thus provide for the required up and down movements of the block 118. When the knot has been tightened, the braid is cut between the knot and the needle 8 and at such a point as to leave extending from the eye of the needle a free end of the braid similar to the free end 13 illustrated in Figs. 20 and 21, and of a proper length for the success of the next tufting operation.

Figures 6, 8, 9, 13A:
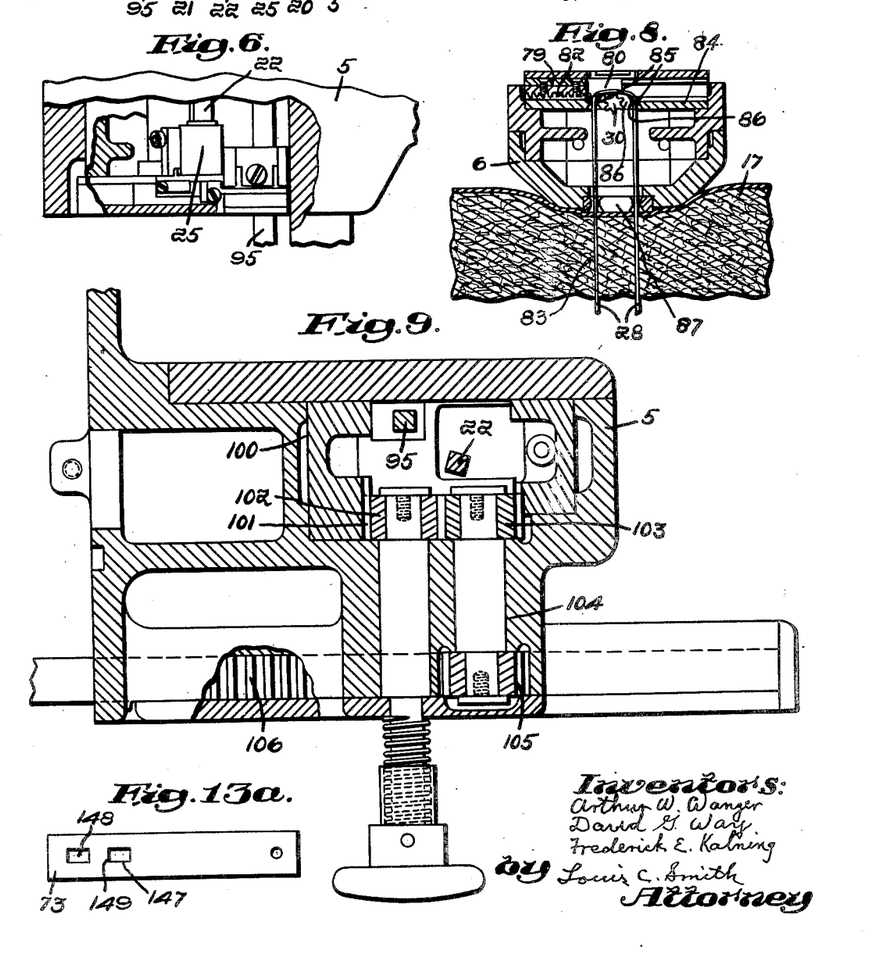
Figure 11:
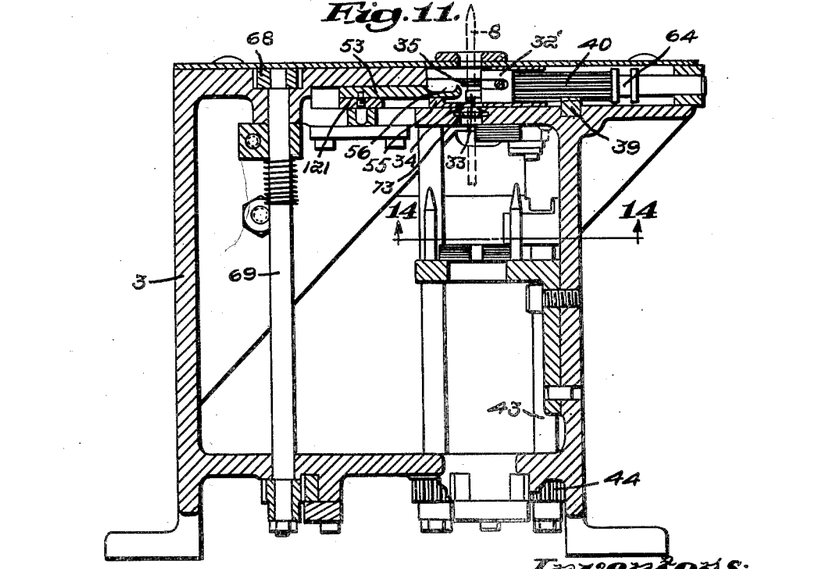
Fig. 11 is a section on the line 11—11, Fig. 10.
Figure 13:
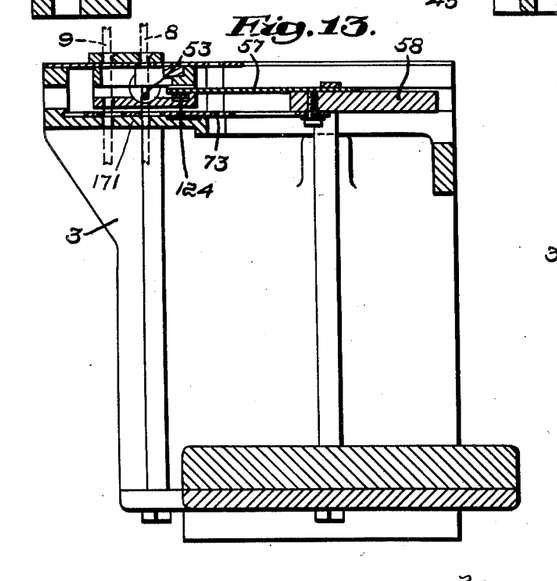
Fig. 13 is a section on the line 13—13, Fig. 10.

The severing of the braid is performed by a knife element 73 which is carried by the underside of the slide 58 on which the hook 57 is mounted, said knife element being located below the looper 32 (see Fig. 11). Said knife element has two elongated openings 147 and 148 (see Fig. 13a) through which the needles 8 and 9 operate and the edge 149 of the opening 147 is a cutting edge so that during the final backward movement of the slide 58 said edge cooperates with a stationary plate 171 to cut the braid.

After the tufting loop 28 has been completed by tightening the knob 71 and cutting braid, said loop is reeved through the mattress, thereby drawing the knot through the mattress ticking 78 into the body of the mattress as seen in Fig. 32. It will be remembered that when during the formation of the loop 28 the free end 13 of the braid is transferred from the needle 8 to the needle 9, it is carried over a rotary toothed member 30 mounted in the compression foot 6. Said toothed member is capable of both rotary movement about its axis and of bodily movement in the direction of its axis.

Figure 7:
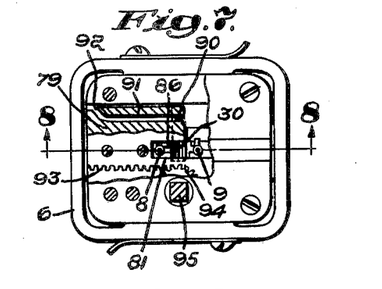
Fig. 7 is a section on line 7—7, Fig. 4.

Mounted in the compression foot is a sliding block 79 which is movable therein in a direction at right angles to the axis of the rotary member, said block having teeth 80 on its underside which mesh with the teeth of the rotary member 30. Said block also has a notch or slot 81 through which the rear needle 8 operates when the block is in its inoperative position shown in Figs. 7 and 8, a position it occupies during the formation of the loop 28 in the mattress. When the knot 71 has been tied and tightened and the braid has been cut, the block 79 is moved to the right in Figs. 7 and 8 thereby rotating the toothed member 30 clockwise (see Fig. 8). The block 79 has on its underface a second set of teeth 82 which are relatively thin and which are situated so that when the block moves forward they ride over and engage the exposed portion 29 of the tape. During the forward movement of the block said exposed portion 29 is gripped between the teeth 82 of the block and the teeth of the rotary member 30 so that the leg 83 of the loop 28 is drawn upwardly through the mattress and the other leg of said loop 28 is fed downwardly. The loop 28 is thus reeved through the mattress and the knot 71 is drawn through the ticking and into the mattress body as shown in Fig. 32. The block 79 is given its back and forth movement by means of a vertical shaft 95 mounted in bearings 151 carried by the stem 100 to which the compressor foot 6 is secured, said shaft having a pinion 94 thereon which meshes with rack teeth 93 formed on the side of said block.

Figure 4:
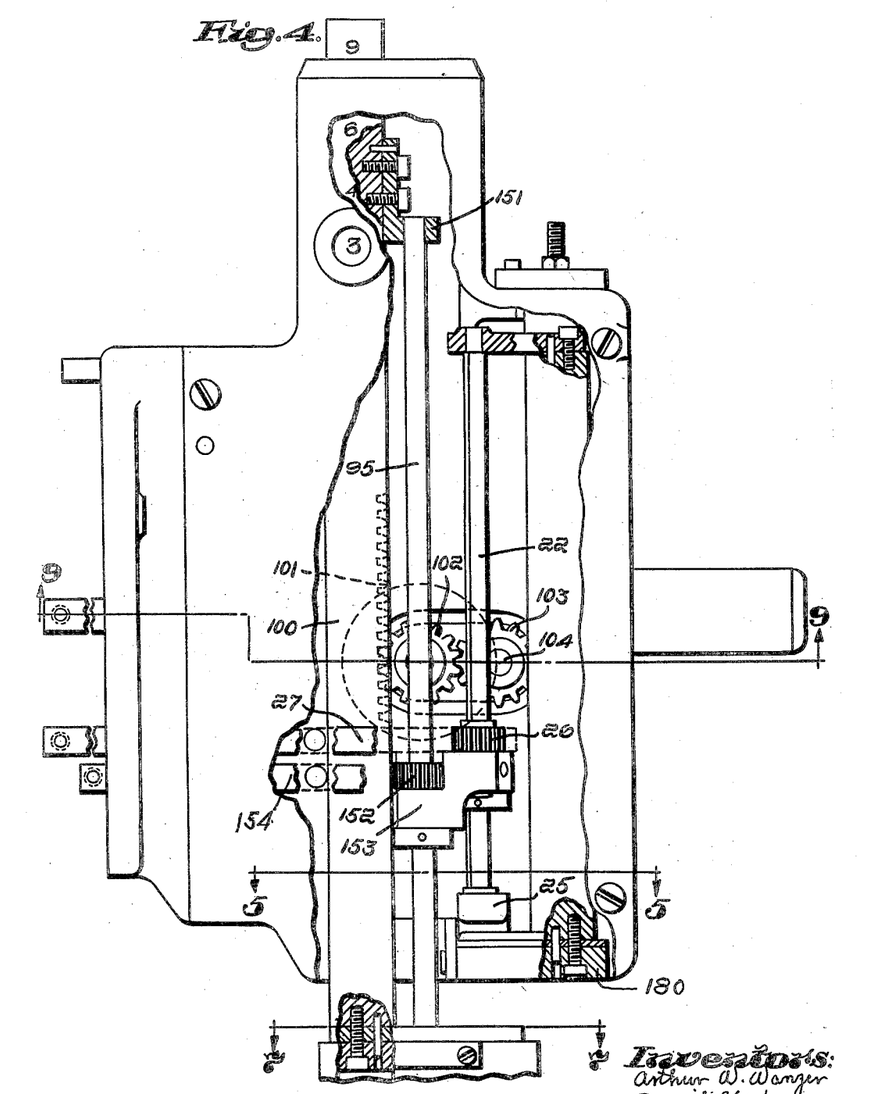
Fig. 4 is a side view of the upper head with parts broken out.

The shaft 95 has splined thereto a second pinion 152 which is held from vertical movement by a bearing member 153 (see Fig. 4), and said second pinion meshes with a rack bar 154 slidably carried by the upper head 5. Said rack bar 154 is connected by a suitable link connection to a cam mounted on the cam shaft 52.

The compression foot 6 has a plate element 84 through which the needles pass during their mattress penetrating movement, and the needle openings 85 in said plate are connected by a slot 86. The rotary member 30 normally extends transversely across said slot and is thus beneath the exposed portion 29 of the loop 28. Means are provided whereby after the knot 71 has been drawn through the ticking, said toothed member 30 is moved in the direction of its axis sufficiently to withdraw it from beneath the exposed portion of the loop 28 and to uncover the slot 86, thus allowing the end 29 of said loop to drop down through said slot and the opening 87 in the compressor foot 6. In this way the loop 28 is entirely discharged from the compressor foot and as soon as the latter is raised the compressed mattress will expand and tighten the loop 28. In order to give the rotary member 30 its axial movement for uncovering the slot 86, said member is formed with a circumferential groove 88 (see Fig. 7a) in which is received a pin 89 depending from a plate 90 slidable in ways parallel to the axis of said rotary member. Said plate has a pin 156 on its upper side which operates in a groove 91 formed in the block 79. Said groove is straight for the major portion of its length, but at its rear end it has the cam portion 92. During the major portion of the forward movement of the block 79 and while the loop 28 is being reeved through the mattress, the pin 156 is travelling in the straight portion of the slot 91, but during the final forward movement of said block, said pin 156 is acted on by the cam portion 92 of the slot and the rotary member 30 is thus moved axially to uncover the slot 86 thereby to release the tufting loop 28. We have described above the operation of the clamping member 126 in clamping the braid while the block 118 is moving downwardly to tighten the knot 71.

Figures 7A, 12, 15A:
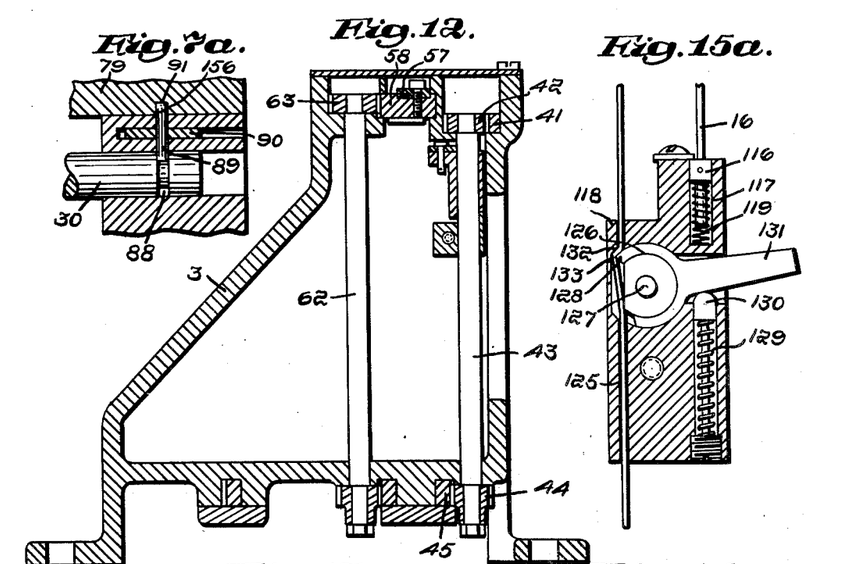

It should be remarked that said clamping member is also operative to clamp the braid as shown in Fig. 15a during the time when the needle 8 is being thrust upwardly through the mattress, thereby preventing said needle from becoming de-threaded during such operation. For this purpose the cams which control the vertical movement of said block relative to the needle bar 7 are so designed that said block is held in its lowered position, i. e., the position in which it is in its operative clamping position as shown in Fig. 15a, after the knot has been tightened and until the needle 8 has been again thrust upwardly through the mattress during the next tufting cycle.

Figure 14:
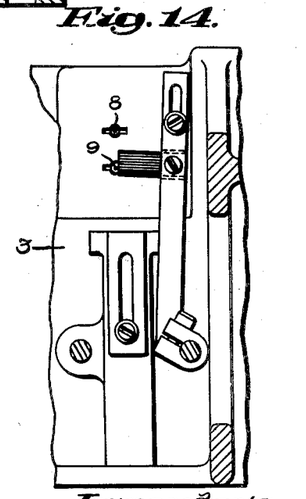
Fig. 14 is a section on the line 14—14, Fig. 11.

The clamping member 126 may, therefore, be regarded as normally in clamping position under the influence of the spring 129, and as being moved into and held in open or non-clamping position as shown in Fig. 14 during the interval elapsing between the transfer of the free end 13 of the braid from the threaded needle 8 to the eye of the needle 9 and the final tightening of the knot 71, this being the time during which braid is being paid out through the needle 8 to form the tufting loop 28 and the knot 71.

While we have used the term "braid" when referring to the tufting strand, yet we wish to state that this term is to be given an interpretation broad enough to include a cord, or a tape, as well as a braid, or any other suitable tufting strand.

We claim:

1. A mattress tufting machine comprising a frame, means mounted thereon to pass a tufting braid upwardly through a mattress to be tufted at one point therein and then downwardly through the mattress at another point thereby forming a loop of braid in the mattress with a portion of the loop exposed on the top surface of the mattress, means also carried by the frame to knot together the two legs of the loop beneath the mattress, a rotary toothed member mounted on the frame above the mattress being tufted and over which passes said exposed portion of the braid, and means cooperating with said toothed member to reeve the braid forming the loop through the mattress thereby to pull the knot through the mattress ticking on the under side thereof.

2. A mattress tufting machine comprising a frame, means mounted thereon to pass a tufting braid upwardly through a mattress to be tufted at one point therein and then downwardly through the mattress at another point thereby forming a loop of braid in the mattress with a portion of the loop exposed on the top surface of the mattress, means also carried by the frame to knot together the two legs of the loop beneath the mattress, a rotary toothed member mounted on the frame above the mattress being tufted and over which passes said exposed portion of the braid, a reciprocating member having teeth cooperating with those of the rotary toothed member to grip said exposed portion of the braid, and means to actuate said reciprocating member thereby to reeve the loop of braid through the mattress and thus pull the knot through the mattress ticking on the under side thereof.

3. A mattress tufting machine comprising a frame, means mounted thereon to pass a tufting braid upwardly through a mattress to be tufted at one point therein and then downwardly through the mattress at another point therein thereby forming a loop of braid in the mattress with a portion of the loop exposed on the top surface of the mattress, means mounted on the frame to knot together the two legs of the loop beneath the mattress being tufted, a rotatable toothed member carried by the frame and over which passes the exposed portion of the braid, means cooperating with said toothed member to reeve the loop of braid through the mattress thereby to pull the knot through the mattress ticking on the under side thereof, and means to shed the loop from said rotary member.

4. A mattress tufting machine as set forth in claim 3 having means to move the rotary toothed member in the direction of its axis thereby to shed the loop therefrom.

5. A mattress tufting machine comprising a frame, means mounted thereon to pass a tufting braid upwardly through a mattress to be tufted at one point therein and then downwardly through the mattress therein at another point thereby forming a loop of braid in the mattress with a portion of the loop exposed on the top surface of the mattress, means also carried by the frame to knot together the two legs of the loop beneath the mattress being tufted, a rotatable toothed member carried by the frame and over which passes the exposed portion of the braid, a reciprocating member having teeth cooperating with those of the rotary toothed member to grip the said exposed portion of the braid, and means to give said reciprocating member an operative movement after the knot has been formed thereby to rotate said rotary toothed member and to reeve the loop through the mattress to a sufficient extent to pull the knot through the mattress ticking on the underside thereof.

6. A mattress tufting machine as set forth in claim 5 having means actuated by the reciprocating movement of the reciprocating member to shed the loop from said rotary member.

7. A mattress tufting machine as in claim 5 having means actuated by the reciprocating member after the knot has been pulled through the mattress ticking to move the rotary toothed member axially and thereby shed the loop therefrom.

8. A mattress tufting machine comprising a frame, a lower head and an upper head mounted thereon, a compression foot associated with the upper head, said lower head and compression foot providing between them a space to receive the mattress to be tufted, a braid-carrying needle having an eye adapted to receive a tufting braid with a free end of the braid extending from the eye, a second needle also having an eye, means to move the needles simultaneously upwardly through the lower head, a mattress held between said compression foot and the lower head and also through the compression foot and into the upper head and then to retract said needles, a transfer member to transfer the free end of the braid from the braid-carrying needle into a position extending transversely across the eye of the second needle while said needles are in raised position, means separate from the transfer member to tuck said free end of braid into said eye of the second needle, means to clamp said free end of the braid in said eye of the second needle, whereby during the retracting movement of the needles said end of the braid is pulled downwardly through the mattress, and means carried by the lower head to knot together said braid end and the section of braid between the under side of the mattress and braid-carrying needle.

9. A mattress tufting machine comprising a frame, a lower head and an upper head mounted thereon, a compression foot associated with the upper head, said lower head and compression foot providing between them a space to receive the mattress to be tufted, a braid-carrying needle having an eye adapted to be threaded with a tufting braid with a free end of the braid extending from the eye, a second needle also having an eye, means to move the needles simultaneously upwardly through the lower head, the mattress held between said lower head and the compression foot and through the compression foot and into the upper head and then to retract said needles, a transfer hook element carried by the upper head, means to actuate said hook element to place the free end of the braid in a position extending transversely across the eye of the second needle, a tucking finger separate from the transfer hook means to actuate said finger to tuck the free end of the braid into the eye of said second needle, means to clamp the end of the braid in said eye of the second needle, whereby during the retracting movement of said needle said end of the braid is pulled downwardly through the mattress and means carried by the lower head to knot together said braid end and the section of braid between the under side of the mattress and the braid-carrying needle.

10. A mattress tufting machine as in claim 9 having means to cut the braid between the braid-carrying needle and the knot, and means carried by the compression foot to reeve the loop of braid through the mattress and thereby pull the knot through the mattress ticking into the interior thereof.

11. A mattress tufting machine comprising a frame, a lower head and an upper head mounted on the frame, a compression foot associated with the upper head, said lower head and compression foot providing between them a space to receive the mattress to be tufted, means to move the compression foot downwardly thereby to compress the mattress between it and the lower head, a braid-carrying needle having an eye to receive a tufting braid with the free end thereof extending from said eye, a second needle having an eye, means to move said needles upwardly simultaneously through the lower head, the mattress held between the lower head and the compression foot and through the compression foot and into the upper head, and then to retract said needles, said upward movement of the braid-carrying needle carrying the tufting braid upwardly through the mattress, means carried by the upper head to transfer the free end of the braid from the threaded needle into a position registering with the eye of the second needle, and means also carried by said upper head to tuck said free end of the braid into said last named eye, means to clamp said end of the braid in said eye, whereby during the retracting movement of the needles said end of braid is pulled downwardly through the mattress, means in the lower head to knot together said braid end and the section of braid between the braid-carrying needle and the mattress, means to cut the braid between the knot and the braid-carrying needle, and means carried by the compression foot to reeve the loop of braid through the mattress and thereby pull the knot through the mattress ticking.

12. A mattress tufting machine comprising a frame, means thereon to withdraw tufting braid from a source of supply and pass the end thereof upwardly through a mattress to be tufted at one point thereon and then downwardly through the mattress at an adjacent point, thereby forming a tufting loop of braid in the mattress with a portion of the braid exposed on the upper surface of the mattress, a rotary member carried by the frame and over which said exposed portion of the braid passes, a knotting mechanism mounted on the frame and including means to form a loop in the section of the braid between the source of supply and the mattress with the braid on the supply side of the loop extending diametrically thereacross, means to insert said diametrically extending portion of the braid through said loop to form a supplemental loop, means to pass the end of the braid through said supplemental loop thus forming a loose knot, and means to tighten the knot, means to sever the braid between the knot and the source of supply, and means cooperating with said rotary member to reeve the tufting loop through the mattress and thus pull the knot through the mattress ticking.

13. A mattress tufting machine comprising a frame, a needle having an eye and adapted to be threaded with tufting braid extending from a source of supply and having an end portion extending from the needle eye, a needle bar mounted on the frame and on which said needle is mounted, means to move the needle bar upwardly to insert the needle through the mattress to be tufted thereby carrying the braid therethrough, and then to move the needle bar downwardly to withdraw the needle from the mattress, means carried by the frame to pass the end of the braid downwardly through the mattress at a point spaced from the path of the needle, thereby forming a tufting loop of braid in the mattress, means also carried by the frame to knot together the end of the braid and the portion thereof between the mattress and the withdrawn needle, a braid clamping member mounted on the needle bar, means normally holding said braid clamping member in braid clamping position, means to render the braid clamping member inoperative while the end of the braid is being drawn downwardly through the mattress to form the tufting loop and the knot is being loosely formed, said braid clamping member again becoming operative to clamp the braid after the knot is formed, and means to move the operative clamping member downwardly thereby to apply a knot-tightening strain on the braid.

14. A mattress tufting machine comprising a frame, an upwardly directed needle having an eye and adapted to be threaded with tufting braid extending from a source of supply and having an end portion extending from the needle eye, a needle bar on which said needle is mounted, means carried by the frame to move the needle bar upwardly thereby to insert the needle through a mattress to be tufted thereby carrying the braid therethrough, and then to move the needle bar downwardly to withdraw the needle from the mattress, means to pass the end of the braid downwardly through the mattress at a point spaced from the path of the needle, thereby forming a tufting loop of braid in the mattress, means to knot together the end of the braid and the portion thereof between the mattress and the withdrawn needle, a block mounted on the needle bar for vertical movement relative thereto between an upper and lower position, a braid clamping member carried by said block, a spring acting on the braid clamping member and tending to hold it in braid clamping position, means carried by the needle bar and operative to hold said braid clamping member inoperative against the action of the spring when the block is in its upper position, said spring being released to render the braid clamping member operative when the block moves toward its lower position, and means operative after the knot has been formed to move the block downwardly thereby to render the braid clamping member operative to grip the braid and apply a knot-tightening strain thereto.

15. A mattress tufting machine comprising a frame, means thereon to pass tufting braid from a source of supply upwardly through a mattress to be tufted at one point therein and then downwardly through the mattress at another point, thereby to form a tufting loop in the mattress with one leg of the loop extending to said source of supply, a rotary looper mounted on the frame and having loop-forming projections situated to engage the braid extending to said source of supply and form a loop therein as the looper is rotated, means to rotate the looper, means to form a supplemental loop in the braid and insert it through the loop carried by the looper, means to draw the end of the braid through the supplemental loop, means to shed the loop from the looper thereby forming a loose knot, a braid clamping member, means to move said braid clamping member away from the looper and to render it operative to clamp the braid between the loose knot and the source of supply whereby during such movement a knot-tightening strain is applied to the braid.

16. A mattress tufting machine comprising a frame, means thereon to withdraw tufting braid from a source of supply and pass the end thereof upwardly through a mattress to be tufted at one point therein and then downwardly through the mattress at an adjacent point, thereby forming a tufting loop of braid in the mattress with a portion of the braid exposed on the upper surface of the mattress, a rotary looper mounted on the frame and having loop-forming projections situated to engage the portion of the braid leading from the mattress to the source of supply and form a loop therein as the looper is rotated, a portion of the braid extending diametrically across the loop, means to rotate the looper, a plunger, means to move the plunger to engage said diametrically extending portion of the braid and force it through the loop on the looper to form a supplemental loop, means to draw the end of the braid through the supplemental loop, means to withdraw the plunger and shed the loop from the looper thereby forming a loose knot, a braid clamping member, means to move the braid clamping member away from the looper and to render it operative to clamp the braid between the loose knot and the source of supply during such movement whereby a knot-tightening strain is applied to the braid.

17. A mattress tufting machine comprising a frame, means mounted thereon to withdraw tufting braid from a source of supply aand pass the end thereof upwardly through a mattress to be tufted at one point therein and then downwardly through the mattress at another adjacent point thereby forming a tufting loop of braid in the mattress with a portion of the braid exposed on the upper surface of the mattress, a rotary looper carried by the frame and having three loop-forming projections, one of which is longer than the others, means to rotate the looper, said projections being situated to engage the portion of the braid leading from the mattress to the source of supply as the looper is rotated, thereby to form a loop embracing said projections with a portion of the braid extending diametrically across the loop, a plunger, means to move the plunger to engage said diametrically extending portion of the braid and force it through the loop on the looper to form a supplemental loop, means to draw the end of the braid through the supplemental loop, means to withdraw the plunger and shed the loop from the shorter loop-forming projections, thereby forming a loose knot which is held on the longer loop-forming projection, and means to tighten the knot on said longer loop-forming projection and then shed the tightened knot therefrom.

18. A mattress tufting machine comprising a frame, a lower head and an upper head mounted thereon, a compression foot associated with the upper head, said lower head and compression foot providing between them a space to receive the mattress to be tufted, a braid-carrying needle having an axial bore to receive a tufting braid and an eye communicating with the bore through which the end of the braid is adapted to extend to a point beyond the eye, a second needle also having an eye, means to move the needles simultaneously upwardly through the lower head, a mattress held between said compression foot and the lower head, and also through the compression foot and into the upper head, and then to retract said needles, a transfer hook element, means to actuate said hook element to place the free end of the braid in a position extending transversely across the eye of the second needle, means separate from the transfer hook element to tuck said free end of braid into said eye of the second needle, means to clamp said free end of the braid in said eye of the second needle, whereby during the retracting movement of the needles said end of the braid is pulled downwardly through the mattress, and means carried by the lower head to knot together said braid end and the section of braid between the under side of the mattress and the braid-carrying needle.

ARTHUR W. WANZER.
DAVID G. WAY.
FREDERICK E. KALNING.

References Cited in the file of this patent
UNITED STATES PATENTS

| Number | Name | Date |
|---|---|---|
| 819,953 | Thompson | May 8, 1906 |
| 1,342,423 | Collett | June 8, 1920 |
| 1,360,522 | Gwizdowski | Mar. 20, 1920 |
| 1,524,350 | Gail | Jan. 27, 1925 |
| 1,960,118 | Mathewson | May 22, 1934 |